UNITED STATES PATENT OFFICE.

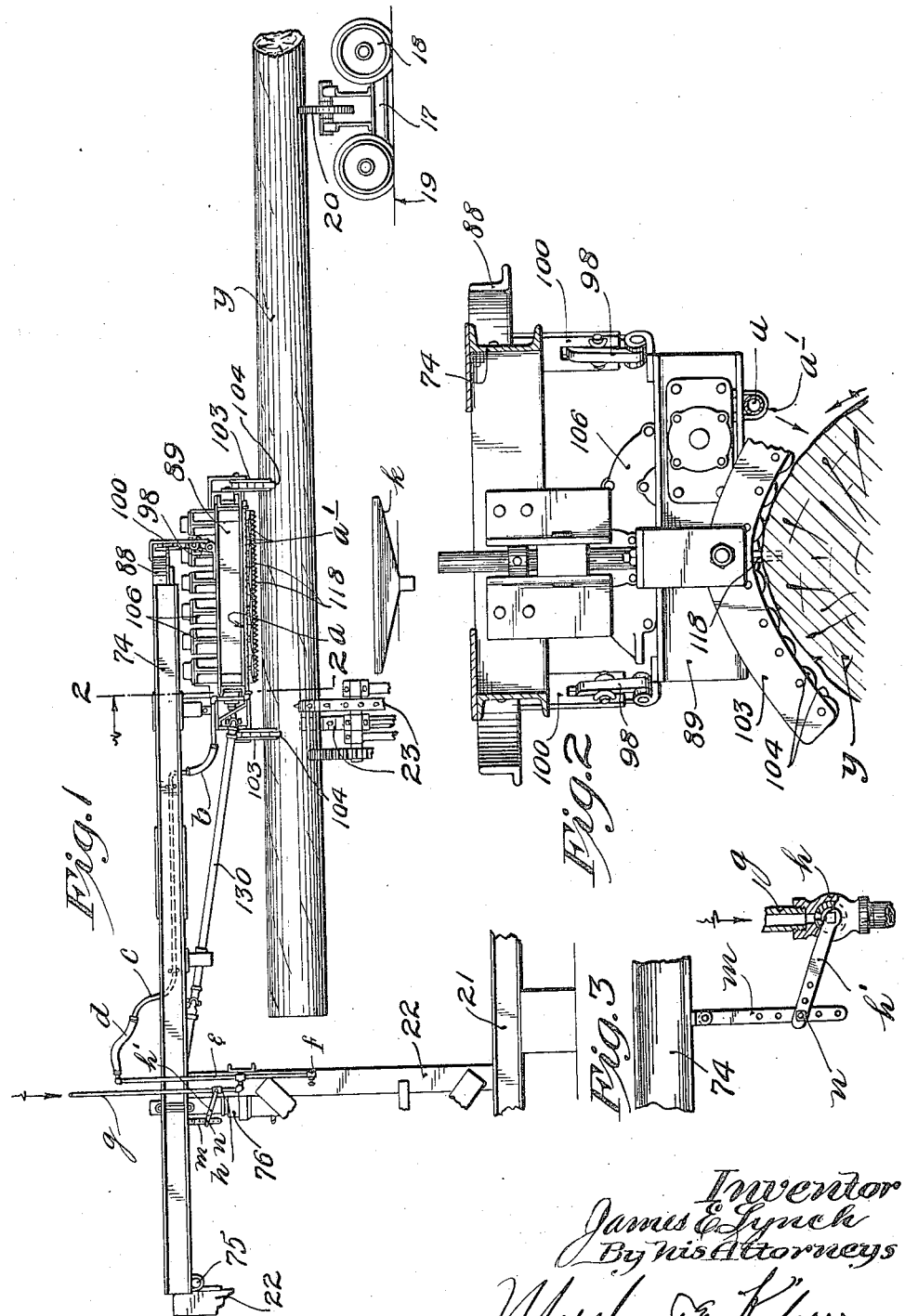

JAMES E. LYNCH, OF MINNEAPOLIS, MINNESOTA, ASSIGNOR TO PAGE & HILL COMPANY, OF MINNEAPOLIS, MINNESOTA, A CORPORATION OF MINNESOTA.

POLE-PUNCTURING MACHINE.

1,424,498.   Specification of Letters Patent.   Patented Aug. 1, 1922.

Application filed March 2, 1922. Serial No. 540,634.

*To all whom it may concern:*

Be it known that I, JAMES E. LYNCH, a citizen of the United States, residing at Minneapolis, in the county of Hennepin and State of Minnesota, have invented certain new and useful Improvements in Pole-Puncturing Machines; and I do hereby declare the following to be a full, clear, and exact description of the invention, such as will enable others skilled in the art to which it appertains to make and use the same.

Particularly, my present invention relates to pole puncturing machines of the general type disclosed and claimed in the application of myself, James E. Lynch, and Arthur R. Sandt, Serial Number 496,651, filed August 29, 1921, and provides a pole-moistening device or attachment therefor, which latter, however, is capable of use in pole puncturing machines generally.

In the use of pole puncturing machines, when the poles are dry, it has been found that the puncturing tools, even when made pointed or sharp, will cut or break the fibers of the pole and, in some cases, will even chip the pole. To prevent this, I provide a moistening device or attachment arranged to deliver onto the pole over that zone that is to be punctured, but in advance of the puncturing operation, a moistening liquid, preferably water, which in the summer time will be cool but in the winter time will be in the form of hot water or, in some cases, steam.

In the accompanying drawings, which illustrate the invention and wherein like characters indicate like parts throughout the several views, this improved moistening device is shown as applied to a pole puncturing machine of the type disclosed and claimed in the application above identified, and its application to this type of machine involves certain special novel features, as will hereinafter appear.

Referring to the drawings:

Fig. 1 is a fragmentary side elevation showing portions of the machine above referred to and illustrating the improved moistening device applied thereto;

Fig. 2 is a vertical section taken approximately on the line 2—2 of Fig. 1 and showing the parts on a larger scale than in Fig. 1; and Fig. 3 is a fragmentary view partly in side elevation and partly in section showing the moisture controlling valve and operating connection therefor.

Of the parts of the pole puncturing machine, in so far as it is important for the purposes of this case to note the same, and using the same numerals that are applied thereto in the said application above identified, said parts are as follows:

The pole $y$ is placed upon a pole-carrying truck comprising a frame 17 having wheels 18 arranged to run on rails 19. To support the pole free for easy rotation, the truck 17 is provided with transversely spaced edgewise aligned pole-supporting wheels 20. The numeral 21 indicates a bed frame on which is supported an upstanding main frame 22. The relatively heavy end portion of the pole, when delivered to the machine, will be supported by peripherally toothed pole-rotating and supporting wheels 23 of the power-driven pole-rotating mechanism.

The pole puncturing device is supported by the overhanging end of a cantilever beam 74, the anchored end of which is pivotally connected at 75 to the main frame 22. Said beam 74, as shown, is arranged to be raised and lowered by a hydraulic cylinder and piston motor 76. The numeral 88 indicates a curved transversely extended rail secured to the extended end of the beam 74, and below this rail is a floating frame 89 suspended from said beam and rail 88 with freedom for slight lateral movements by devices including link structures 98 and 100, which supports are completely disclosed in said pending application above identified. The numerals 103—104 indicate curved roller-equipped pole-engaging saddle bars that are suitably connected to the floating frame 89.

The pole puncturing devices which are carried directly by the floating frame 89 include a plurality of casings 106 and co-operating reciprocating punches 118, which latter are power-driven through a flexible driving shaft 130. The punches 118, when in operation while the pole is being rotated, will puncture a circular zone around the intermediate portion of the pole; and to moisten this zone of the pole in the manner above indicated, I preferably employ a nozzle pipe $a$ extended longitudinally of and rigidly secured to the floating frame 89 at one side of the top of the pole and having perforations $a^1$ positioned to discharge directly onto the upwardly moving surface of the pole, so that the pole surface will be moistened before it is subjected to the punches. The extended end of this nozzle pipe $a$ is closed but the other end thereof is shown as connected by a flexible hose $b$ to a pipe $c$ secured on and extended longitudinally of the beam 74. This pipe $c$ is connected by a short flexible hose $d$ to an upright pipe $e$ that is secured on the main frame 22 and, as shown, is provided at its lower end with a normally closed drain valve $f$. The pipe $e$ is connected to a water or moisture supply $g$ that leads from a source of water or steam supply. The numeral $k$ indicates a drip pan placed below the pole in position to receive the water dripped from the pole.

As is evident, when the valve $h$ is opened, water will run into the nozzle pipe $a$ and will be spread onto the pole as above stated. As also above indicated, the water may be warm or cold, according to the conditions of the weather, and might, in some instances, even be in the form of steam.

In actual practice, this moistening device has been found to very materially improve the action of the puncturing operation. It causes the punches to make holes in the pole by the separation rather than by the cutting or breaking of the fibers of the pole, and forms punctures that will readily absorb creosote or other wood-preserving fluids by subsequent operation and which punctures, when the pole surface becomes well saturated with the preserving fluid, will nearly or quite close under the action of expansion of the wood.

I preferably provide automatic connections for operating the moisture controlling valve $h$. This valve, in Fig. 3, is shown as in an open position and its projecting stem is provided with an arm $h^1$ that is connected by a link $m$ to the beam 74. To provide for adjustments or variations in movements given to the valve $h$, the arm $h^1$ and link $m$ are provided with longitudinally spaced perforations through which a nut-equipped bolt or pin $n$ is passed to pivotally connect the same.

The above arrangement is such that, when the beam 74 is lowered to press the saddle bars 103 onto the pole and to bring the punches 118 into action, the link $m$, operating through the arm $h^1$, will move the valve $h$ into its open position shown in Fig. 3, and when said beam 74 is raised to lift the punches from working position, said link and arm will automatically move said valve into a closed position. This automatically turns on and cuts off the supply of moisture at the right times.

What I claim is:

1. The combination with a machine comprising means for supporting and rotating a pole, an overlying beam, a floating frame supported from said beam and power-driven punches mounted on said floating frame, in combination with a moistening device applied to said floating frame and arranged to deliver moisture onto that zone of the pole that is to be punctured, immediately in advance of the puncturing operation.

2. The structure defined in claim 1 in which said moistening device is in the form of a perforated spraying pipe and in which there is a flexible moisture spraying tube leading therefrom and supported in part by said beam.

3. The combination with a machine having means for puncturing the surface of a pole, of a moistening device arranged to deliver moisture onto that zone of the pole that is to be punctured, immediately in advance of the puncturing operation, said moistening device having a valve and connections for automatically operating the same when the punching means is moved to and from operative position.

4. The structure defined in claim 1 in which said moistening device includes a valve having a connection to said beam whereby it will be automatically operated by vertical movements of said beam.

In testimony whereof I affix my signature.

JAMES E. LYNCH.